United States Patent [19]

O'Horo

[11] 4,124,735
[45] Nov. 7, 1978

[54] MAGNETIC GLASS CARRIER MATERIALS

[75] Inventor: Michael P. O'Horo, Penfield, N.Y.

[73] Assignee: Xerox Corporation, Stamford, Conn.

[21] Appl. No.: 747,117

[22] Filed: Dec. 2, 1976

[51] Int. Cl.$^2$ .......................... B32B 7/10; C03C 3/22; G03G 9/14

[52] U.S. Cl. .................... 428/406; 106/39.6; 252/62.1 P; 252/62.54; 252/62.58; 252/62.59; 252/62.63; 428/402; 428/407; 428/900

[58] Field of Search .................. 427/14, 18, 128; 96/1 SD; 428/900; 252/62.1 P, 62.54, 62.58, 62.59, 62.63; 106/39.6; 428/402, 404, 406, 407

[56] References Cited

U.S. PATENT DOCUMENTS

| | | | |
|---|---|---|---|
| 2,920,971 | 1/1960 | Stookey | 106/39.6 X |
| 2,980,617 | 4/1961 | Ireland | 252/62.59 X |
| 3,214,379 | 10/1965 | Lindquist | 252/62.54 |
| 3,630,911 | 12/1971 | Schultz | 252/62.59 |
| 3,694,360 | 9/1972 | Weaver | 252/62.59 |
| 3,716,630 | 2/1973 | Shirk | 252/62.58 X |
| 3,947,370 | 3/1976 | Miller | 252/62.1 P |

*Primary Examiner*—Ronald H. Smith
*Assistant Examiner*—Stuart D. Frenkel

[57] ABSTRACT

Electrostatographic carrier materials having low bulk densities and high magnetic permeabilities are obtained by providing an alumino-boro-silicate glass particle containing from between about 10 to about 15 molar percent $Fe_2O_3$ in which superparamagnetic ferrite crystallites having an average particle size of up to about 500Å have been precipitated by heat treatment. The magnetic behavior of the glass carrier particles which is dependent on the number present and size of the ferrite crystallites can be closely controlled by heat treatment at temperatures in the range of between about 600° C and 800° C. When mixed with toner particles, these magnetic glass carrier materials experience significantly reduced toner impaction levels.

12 Claims, 7 Drawing Figures

MAGNETIC GLASS CARRIER MATERIALS

BACKGROUND OF THE INVENTION

This invention relates in general to electrophotography, and more particularly, to carrier materials useful in the magnetic-brush type development of electrostatic latent images.

The formation and development of images on the surface of photoconductive materials by electrostatic means is well known. The basic electrostatographic process, as taught by C. F. Carlson in U.S. Pat. No. 2,297,691, involves placing a uniform electrostatic charge on a photoconductive insulating layer, exposing the layer to a light and shadow image to dissipate the charge on the areas of the layer exposed to the light and developing the resulting electrostatic latent image by depositing on the image a finely divided electroscopic material referred to in the art as "toner". The toner will normally be attracted to those areas of the layer which retain a charge, thereby forming a toner image corresponding to the electrostatic latent image. This powder image may then be transferred to a support surface such as paper. The transferred image may subsequently be permanently affixed to the support surface as by heat. Instead of latent image formation by uniformly charging the photoconductive layer and then exposing the layer to a light and shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing step.

Many methods are known for applying the electroscopic particles to the electrostatic latent image to be developed. One development method, as disclosed by E. N. Wise in U.S. Pat. No. 2,618,522 is known as "cascade" development. In this method, a developer material comprising relatively large carrier particles having finely-divided toner particles electrostatically clinging to the surface of the carrier particles is conveyed to and rolled or cascaded across the electrostatic latent image-bearing surface. The composition of the toner particles is so chosen as to have a triboelectric polarity opposite that of carrier particles. As the mixture cascades or rolls across the image-bearing surface, the toner particles are electrostatically deposited and secured to the charged portion of the latent image and are not deposited on the uncharged or background portions of the image. Most of the toner particles accidentally deposited in the background are removed by the rolling carrier, due apparently, to the greater electrostatic attraction between the toner and the carrier than between the toner and the discharged background. The carrier particles and unused toner particles are then recycled. This technique is extremely good for the development of line copy images. The cascade development process is the most widely used commercial electrostatographic development technique. A general purpose office copying machine incorporating this technique is described in U.S. Pat. No. 3,099,943.

Another technique for developing electrostatic latent images is the "magnetic brush" process as disclosed, for example, in U.S. Pat. No. 2,874,063. In this method, a developer material containing toner and magnetic carrier particles is carried by a magnet. The magnetic field of the magnet causes alignment of the magnetic carriers in a brush-like configuration. This "magnetic brush" is engaged with an electrostatic-image bearing surface and the toner particles are drawn from the brush to the electrostatic image by electrostatic attraction. In magnetic brush development, the general requirements for such carrier particles is that they be soft magnetic materials with moderately large susceptibility, high resistivity, and be capable of generating a triboelectric charge strong enough to attract the toner particles. Most conventional magnetic carrier particles do not possess these properties, and moreover, reproducible properties in such materials are extremely difficult to obtain in batch preparation techniques.

While ordinarily capable of producing good quality images, conventional developing materials suffer serious deficiencies in other areas. Some developer materials, though possessing desirable properties such as proper triboelectric characteristics, are unsuitable because they tend to cake, bridge and agglomerate during handling and storage. Furthermore, with some polymer coated carrier materials flaking of the carrier surface will cause the carrier to have nonuniform triboelectric properties when the carrier core is composed of a material different from the surface coating thereon. In addition, the coatings of most carrier particles deteriorate rapidly when employed in continuous processes which require the recycling of carrier particles by bucket conveyors partially submerged in the developer supply such as disclosed in U.S. Pat. No. 3,099,943. Deterioration occurs when portions of or the entire coating separates from the carrier core. The separation may be in the form of chips, flakes or entire layers and is primarily caused by fragile, poorly adhering coating materials which fails upon impact and abrasive contact with machines parts and other carrier particles. Carriers having coatings which tend to chip and otherwise separate from the carrier core or substrate must be frequently replaced thereby increasing expense and loss of productive time. Print deletion and poor print quality occur when carriers having damaged coatings are not replaced. Fines and grit formed from carrier disintegration tend to drift to and from undesirable and damaging deposits on critical machine parts.

Another factor affecting the stability of the triboelectric properties of carrier particles is the susceptibility of carrier coatings to "toner impaction". When carrier particles are employed in automatic machines and recycled through many cycles, the many collisions which occur between the carrier particles and other surfaces in the machine cause the toner particles carried on the surface to the carrier particles to be welded or otherwise forced onto the carrier surfaces. The gradual accumulation of impacted toner material on the surface of the carrier causes a change in the triboelectric value of the carrier and directly contributes to the degradation of copy quality by eventual destruction of the toner carrying capacity of the carrier. This problem is especially aggravated when the carrier particles, and particularly the carrier cores, are prepared from materials such as iron or steel having a high specific gravity or density since during mixing and the development process the toner particles are exposed to extremely high impact forces from contact with the carrier particles. It is apparent from the descriptions presented above as well as in other development techniques, that the toner is subjected to severe physical forces which tend to break down the particles into undesirable dust fines which become impacted onto carrier particles. Various attempts have been made to decrease the density of the carrier particles and reduce the concentration of the magnetic component by admixture of a lighter material, such as a resin, either in the form of a coating or as a uniform dispersion throughout the body of the carrier granule. This approach is useful in some instances but the amount of such lighter material sufficient to produce a substantial decrease in density has been indicated as seriously diminishing the magnetic response of the carrier particles as to cause a deterioration in the properties of a magnetic brush formed therefrom. One such attempt is disclosed in U.S. Ser. No. 699,030, filed Jan. 18, 1968, wherein the carrier particles comprise a low density, non-magnetic core such as a resin, glass, or the like having coated thereon a thin, continuous layer of a ferromagnetic material. It is therein indicated that a coating of finely powdered iron or other subdivided ferromagnetic material does not show the high response to a magnetic field which is displayed by the continuous layers of the invention. Another earlier attempt at low density carrier materials is disclosed in U.S. Pat. No. 2,880,696 wherein the carrier material is composed of particles having a magnetic portion. The core therein may consist entirely of a magnetic material, or it may be formed of solid insulating beads such as glass or plastic having a magnetic coating thereon, or the core may consist of a hollow magnetic ball. However, for unknown reasons, the recited materials have apparently never been commercially successful. Thus, there is a continuing need for a better developer material for developing electrostatic latent images.

SUMMARY OF THE INVENTION

It is, therefore, an object of this invention to provide electrostatographic developer materials which overcome the above-noted deficiencies.

It is another object of this invention to provide a process for preparing magnetically responsive carrier particles which exert reduced impact forces to toner particles.

A further object of this invention is to provide improved developer compositions for use in magnetic brush development.

A still further object of this invention is to provide lower density carrier materials having a magnetic response.

It is another object of this invention to provide developer materials having physical and electrostatographic properties superior to those of known developer materials.

The above objects and others are accomplished in accordance with this invention, generally speaking, by providing a low density, magnetic, composite electrostatographic carrier particle comprising an alumino-boro-silicate glass particle containing from between about 10 to about 15 molar percent $Fe_2O_3$ in which superparamagnetic ferrite crystallites having an average particle size of up to about 500A have been precipitated by heat treatment. In accordance with this invention, the magnetic behavior of the glass carrier particle, which is dependent on the number present and the size of the ferrite crystallites, can be closely controlled by heat treatment at temperatures in the range of between about 600° C. and about 800° C. It has also been found that the magnetic glass particle has a high resistivity, that is, on the order of about $10^6$ to about $10^{12}$ ohm/cm., and thus possesses the necessary triboelectric response with insulating resinous toner particles without the need for coating the glass carrier particle with typical insulating polymeric resin coatings.

Thus, the magnetic glass carrier particle of this invention may be prepared as to provide it with controllable magnetic and electrical properties by controlled heat treatment thereof. The magnetic glass carrier particles thus prepared are superparamagnetic in that they have a susceptibility comparable to a bulk ferrite material yet are ideally soft materials displaying no hysteresis behavior. The magnetic glass carrier particles of this invention can be readily formed into spherical beads without the difficulties encountered, such as porosity, when preparing sintered ferrite beads as to provide low density magnetic carrier particles which possess uniform electrostatographic properties.

Figure 1:
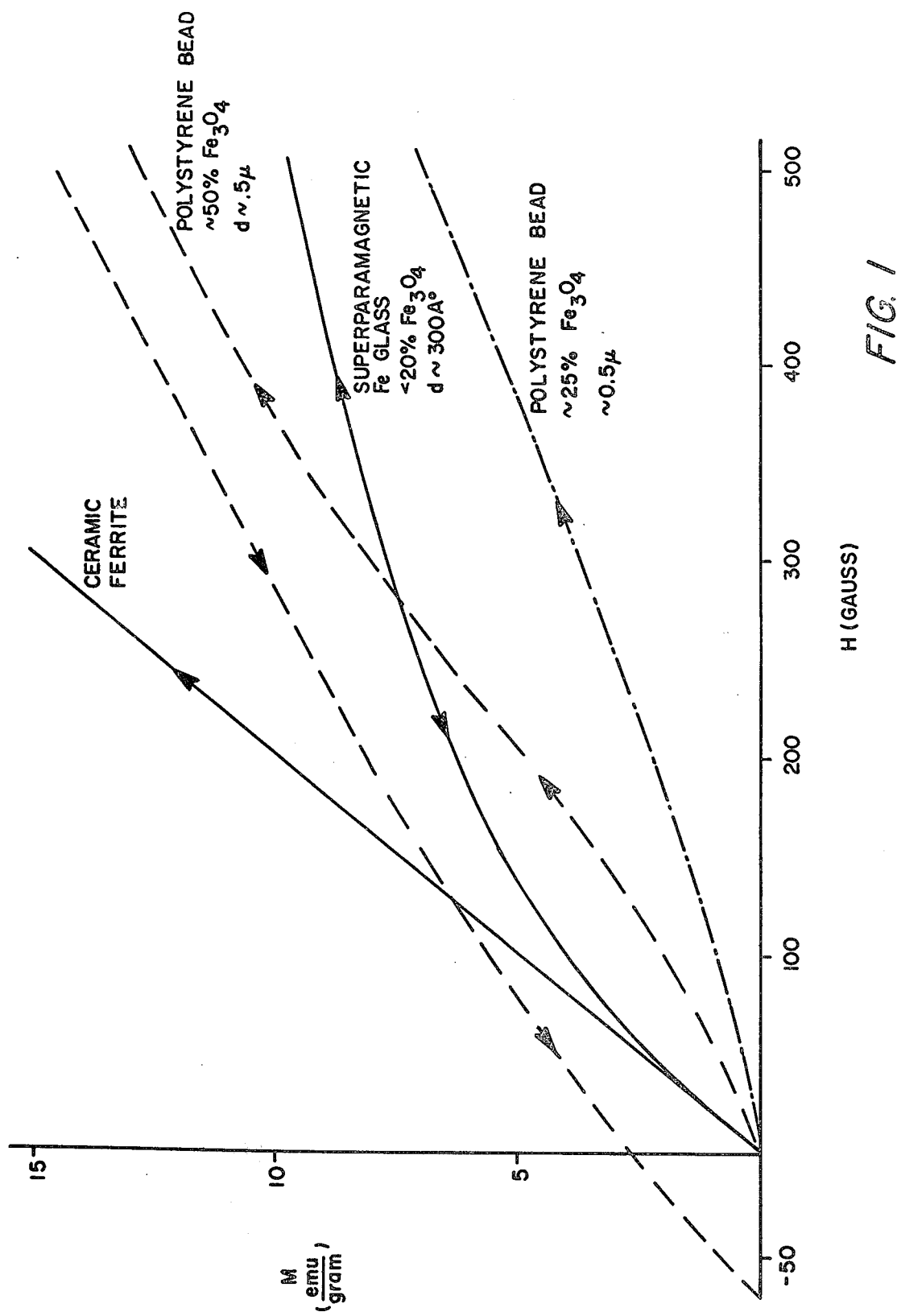
FIG. 1 illustrates the magnetic behavior of various magnetic compositions under exposure to various magnetic fields.

Generally speaking, when employing magnetic carrier particles in an electrostatographic development system the applied magnetic fields are in the range of from about 100 to about 500 Oersted. These magnetic fields are well below the saturation fields which are usually in the range of about 2000 to about 4000 Oersted for most materials. Thus, the initial magnetic susceptibility governs the magnetic response of the systems. However, due to the unique magnetic properties of the superparamagnetic system of this invention, the limitations on initial susceptibility imposed on large particle systems by demagnetization can be neglected and the initial susceptibility can be shown to be proportional to $I_S^2 V/3KT$ where $I_S$ is the intrinsic magnetization of the particle. Therefore, a superparamagnetic system will have equivalent or greater initial susceptibility than an equivalently loaded multidomain particle system. By reference to FIG. 1 in which the magnetic response of a superparamagnetic precipitated glass system is compared to a dispersion of multidomain $Fe_3O_4$ particles in a polymer matrix at different loadings, the superparamagnetic system is seen to have a much greater initial magnetic susceptibility.

In addition, the composition of this invention is an ideal soft magnet in that it exhibits no hysteresis. This has been found to be a direct consequence of the superparamagnetism of this composition which is turn is due to the small dimensions of the magnetic particles. The lack of hysteresis in this composition may be seen by further reference to FIG. 1 for the superparamagnetic glass system. By comparison, the multidomain dispersed system is seen to possess definite hysteresis with a large remanence ($\sigma_R$) and coercive force (Hc).

Figure 2:
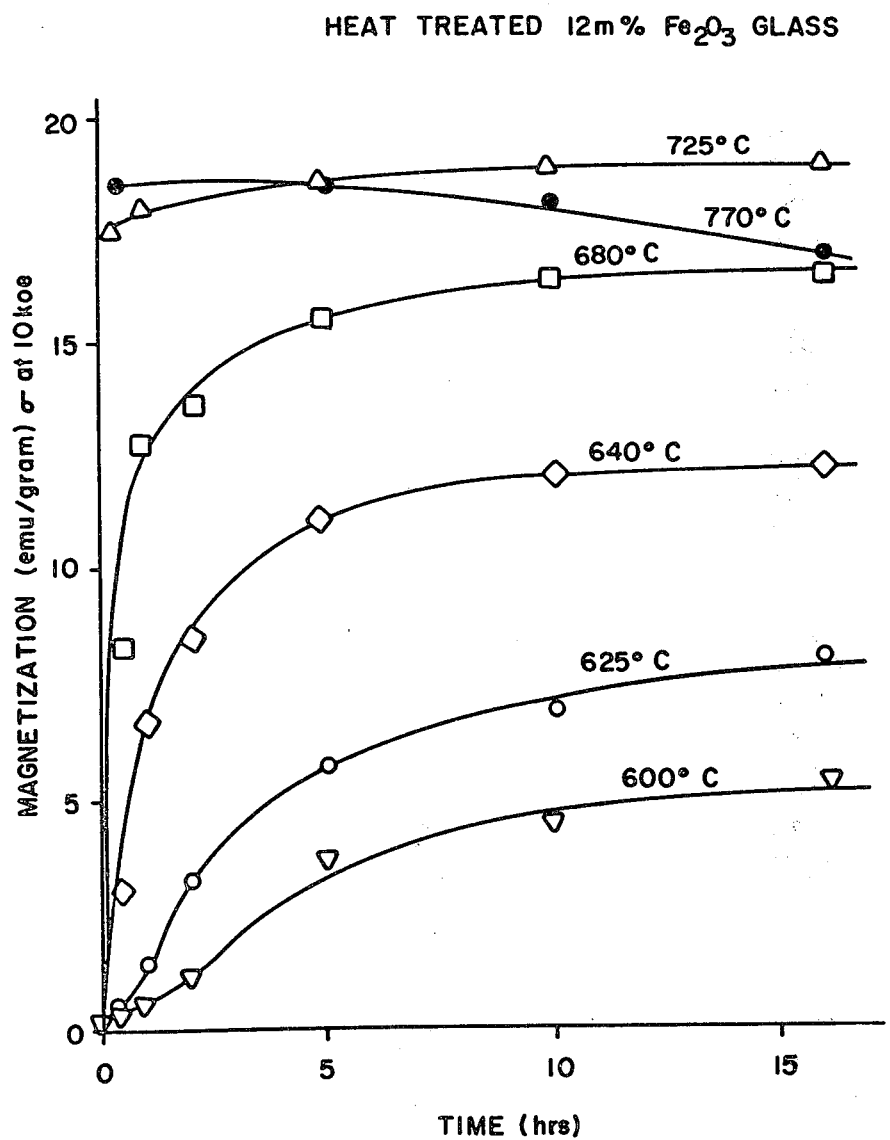
FIG. 2 depicts the effect on saturation magnetization caused by various treatments of the compositions of this invention.
Figure 3:
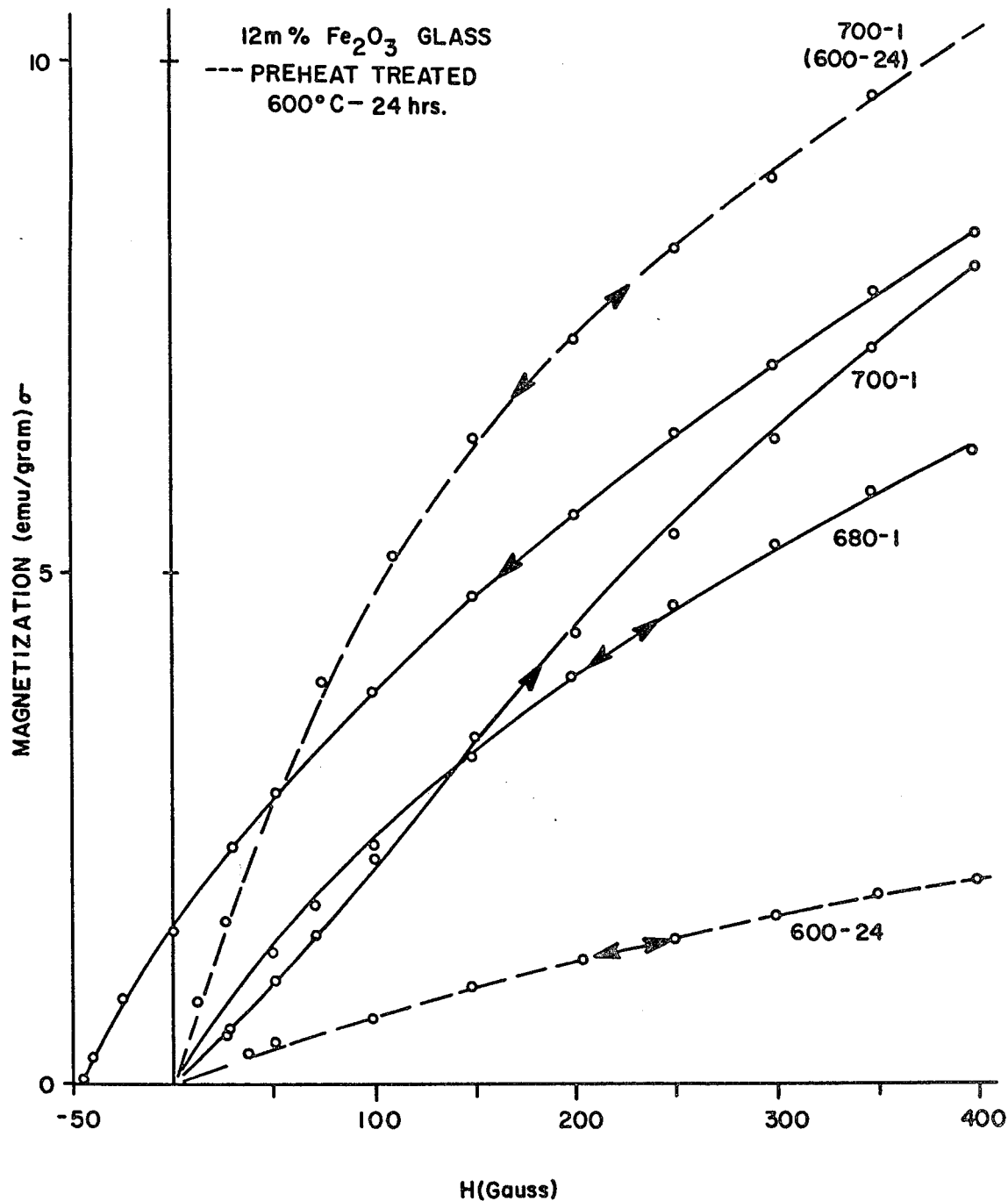
FIG. 3 illustrates the magnetic properties of the compositions of this invention caused by a two-stage treatment.
Figure 4:
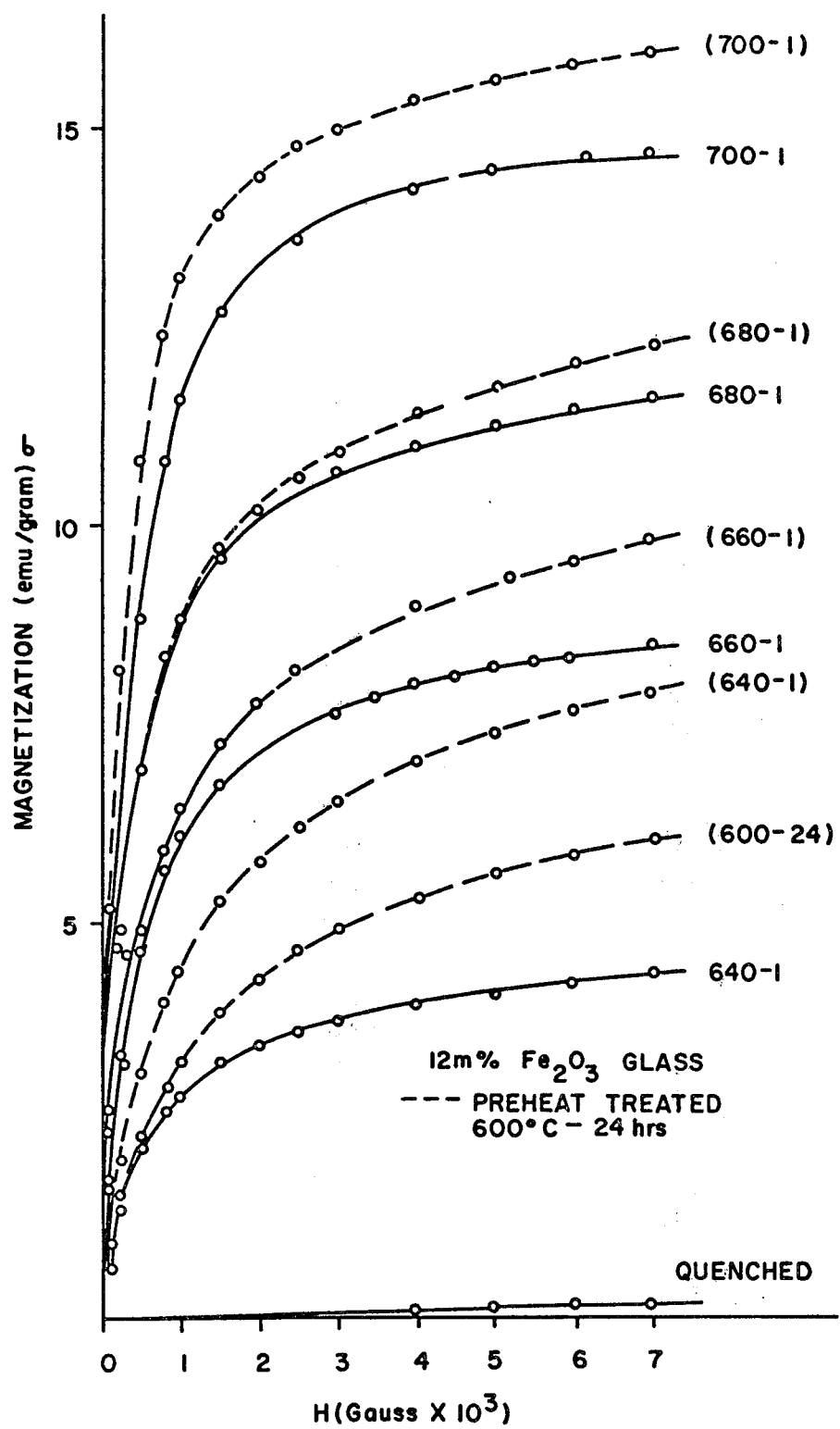
FIG. 4 is another illustration of the magnetic properties of the compositions of this invention caused by a two-stage treatment.

In accordance with this invention, it has been found that the magnetic parameters such as initial magnetic susceptibility and saturation magnetization ($\sigma_{sat}$) can be controlled by various preparative techniques. It has been found that multistage heat treatments, after the glass has been formed, determine the morphology of the precipitation and the consequent magnetic properties of the present magnetic glass carrier particles. FIG. 2 graphically depicts the effects of various heat treatment times and temperatures on the saturation magnetization properties of the compositions of this invention. FIGS. 3 and 4 illustrate the magnetization properties of the compositions versus applied field and the significant effects that a two stage heat treatment has on their magnetic behavior.

Figure 5:
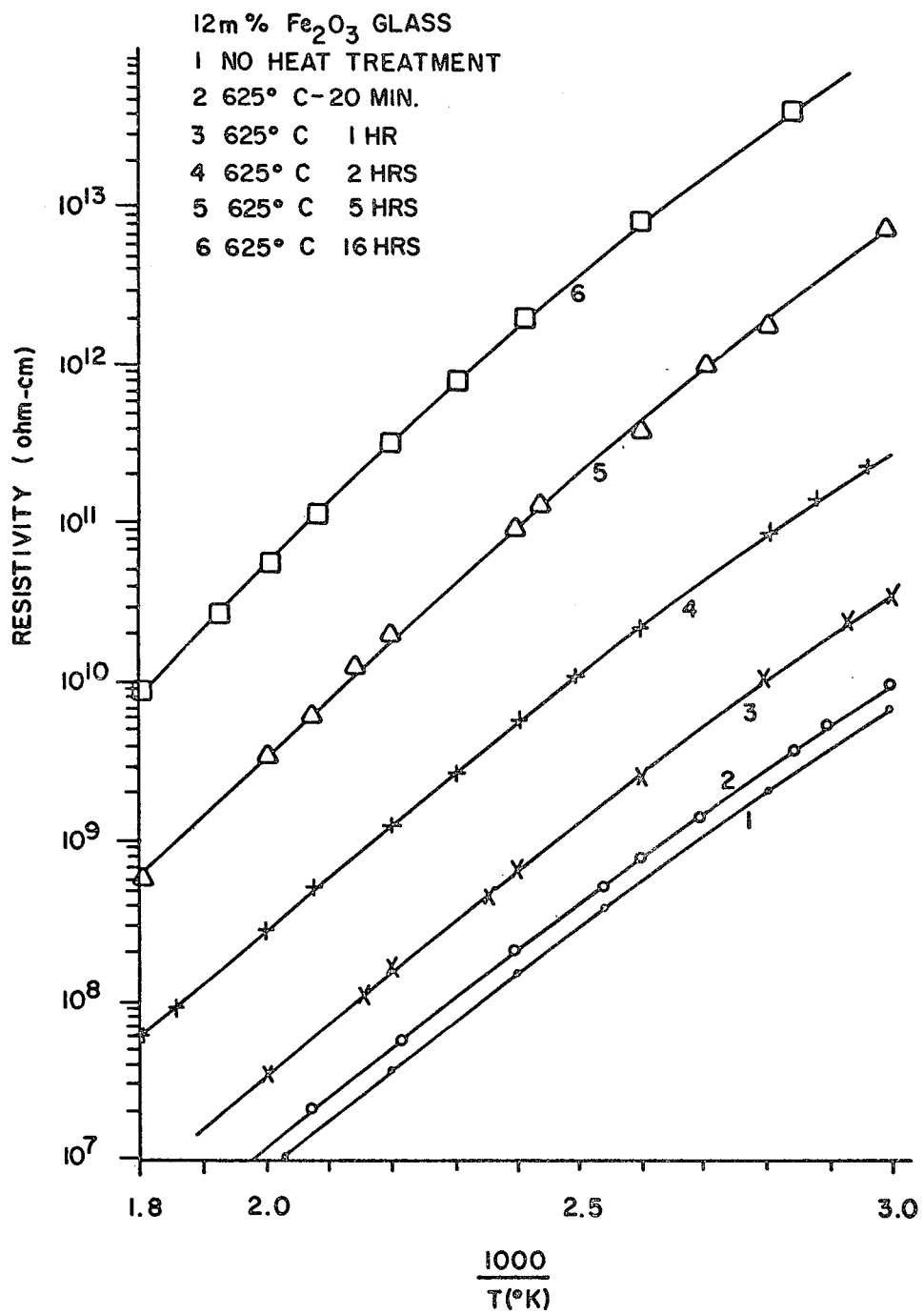
FIG. 5 illustrates that the insulating state of the compositions of this invention increases with heat treatment.
Figure 6:
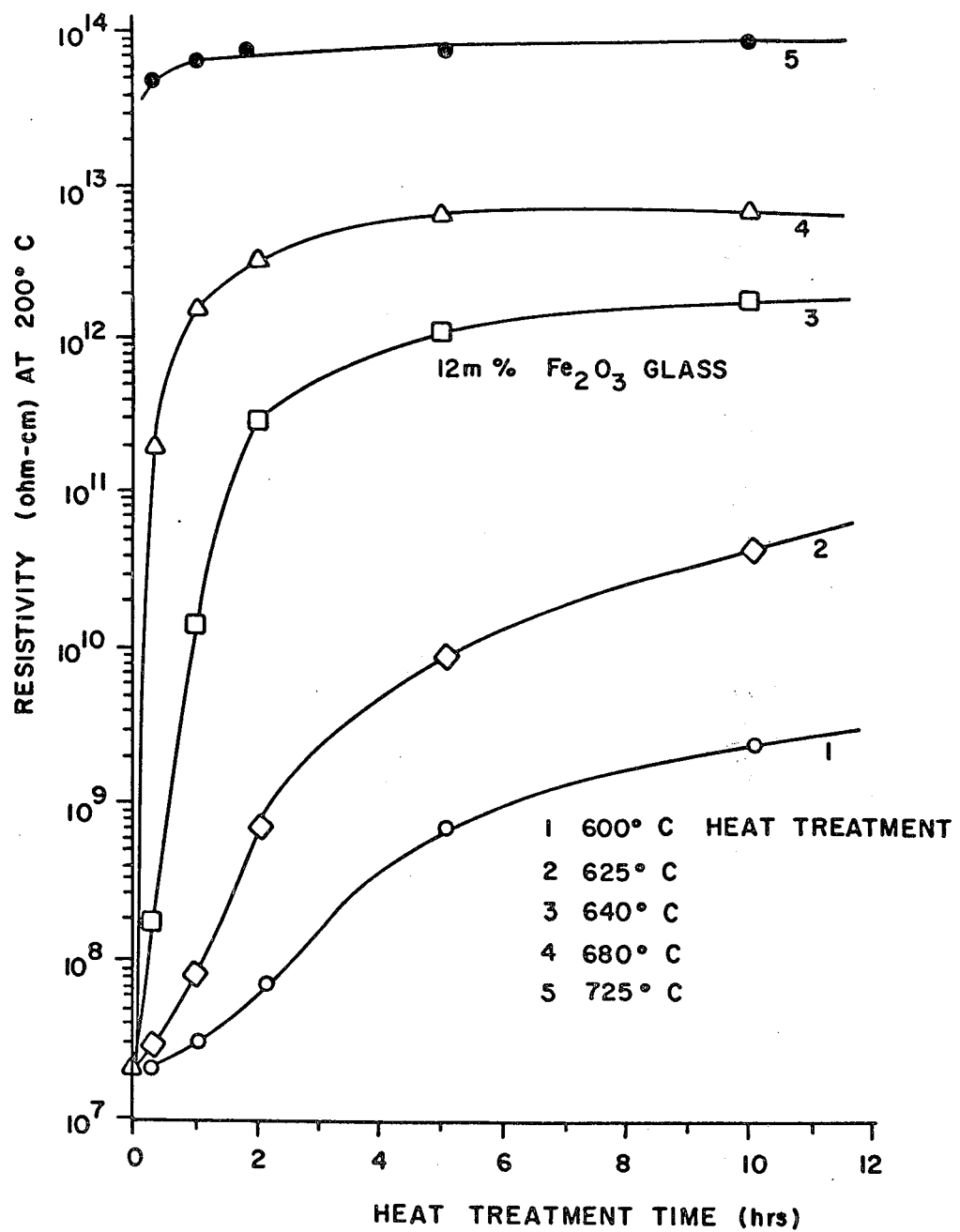
FIG. 6 is another illustration showing that the resistivity of the compositions of this invention increases with heat-treatment thereof.

Further, the conductivity of the compositions of this invention is in the insulator range, that is, greater than about $10^{-10}$ ohm-cm. at 25° C. The conduction process is due to electronic, as opposed to ionic transport, and no time dependent polerization effects have been found present. As shown in FIGS. 5 and 6, the insulating state of the glass system increases with heat treatment induced precipitations.

The glass component of the compositions of this invention is preferably a boro-silicate glass containing CaO and $Al_2O_3$ added as modifiers for lower viscosity. The magnetic component is preferably iron added in the form of $Fe_2O_3$ in an amount of from about 10 to about 12 molar percent based on the base glass composition and such as to maintain the relative molar proportions of the base glass components. The boro-silicate glass composition is preferably about 40 molar percent $SiO_2$, about 30 molar percent $B_2O_3$, about 20 molar percent CaO, and about 10 molar percent $Al_2O_3$.

In the practice of this invention, the compositions are prepared by first mixing together all of the components in the form of oxide powders. The mixture is then melted, with stirring, in a crucible, preferably platinum, at temperatures exceeding 1300° C. To ensure homogeneity, the melt is quenched in water, ground, and remelted. Typically, the final melt is held at a temperature of about 1350° C. for about 3 hours and then quenched into a plate such as graphite. Generally, melting is performed in a SiC resistance heating furnace in an air atmosphere. The magnetic phase which is precipitated in $Fe_3O_4$ and the desired $Fe^{3+}/Fe^{2+}$ ratio obtained in the glass is about 2.0 which is that found in $Fe_3O_4$. It has been determined by empirical means that a heat soak of about 1350° C. for about 3 hours is usually sufficient to result in a redox reaction providing a melt $Fe^{3+}/Fe^{2+}$ ratio of about 2.0. Following quenching, the glass is usually black in color and shows no microscopic inhomogeneities either by optical inspection or chemical analysis. The chemical composition of the quenched melt is generally within ±5 percent of the expected values. Further, the quenched materials are usually totally amorphous in the bulk and likewise on the surface. No trace of crystallinity has been found by either X-ray diffraction or electron microscopy. However, microinhomogeneities in the form of amorphous phase separation has been found by TEM, density, and magnetic measurements. The phase separation has been found to be fine, that is, on the order of about 100A, and to consist of an isolated Fe rich phase and a continuous Fe depleted phase. Magnetic measurements have shown that the Fe rich phase contains amorphous clusters of anti-ferromagnetically coupled Fe ions. At room temperature, the bulk glass shows paramagnetic behavior due primarily to the nonclustered Fe ions in the glass. Electronic conduction is due to a hopping process between the aliovalent Fe ions in the continuous amorphous phase.

Heat treatments on the compositions of this invention are satisfactorily performed in a tube furnace wherein the temperature may be controlled within about 1° C. The time of treatment is determined from the point at which the treated composition reaches the designated heat treatment temperature after being placed in the preheated furnace. The time required to reach each temperature is typically about ten minutes. Preferably, the heat treatment temperature varies from between about 600° C. and about 800° C. for up to about 24 hours, because when the heat treatment temperature is below 600° C., that is, the glass transition temperature, substantially no precipitation occurs, while above 800° C. the glass shows appreciable softening and the precipitates begin to redissolve. The precipitated crystalline phase after heat treatment is $Fe_3O_4$ having a cubic spinel structure. It has been found that the morphology of the precipitates is heat treatment temperature dependent in that they initially show a uniform dispersion, have a spherical shape and little size distribution. With longer heat treatment times at about 600° C., the number of particles remains essentially constant with precipitation proceeding by the increasing volume of each particle. By comparison, the morphology of the initial precipitates strongly indicates heterogeneous nucleation from pre-existing nuclei which have been identified with the amorphous Fe clusters found in the quenched phase separated glass. With heat treatment above about 640° C., the precipitates demonstrate a drastic morphology change wherein the precipitates form spherical clusters distributed throughout the glass matrix and show signs of sintering. At higher temperatures these clusters have coarsened to form much larger multigrain particles. The clustering is due to the concurrent growth of the amorphous phase separated region, together with the precipitation. In addition, at heat treatment temperatures above 640° C. the growth of the amorphous phase is faster than precipitation so that the precipitates assume the morphology of the Fe rich amorphous phase.

Figure 7:
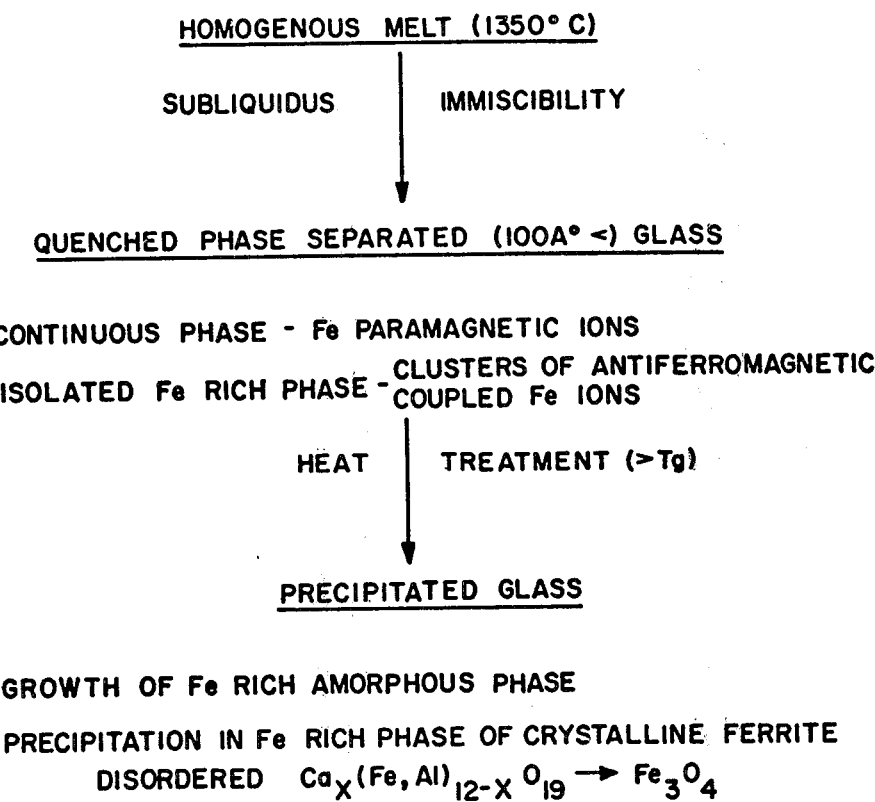
FIG. 7 is a schematic flow diagram depicting the preparation process steps to provide the compositions of this invention.

The cluster morphology displayed in the materials heat treated above 640° C. is not conducive to superparamagnetic behavior. Ideally, a superparamagnetic system consists of a large number of non-interacting, spherical, uniform sized crystallites having a size of between about below 100-300A. Any change in the precipitate's shape or size distribution will ordinarilly cause large deviations from ideal superparamagnetic behavior. However, the formation of precipitate clusters and coarsening can be prevented by a two stage heat treatment which preserves the uniform precipitate distribution found in compositions heat treated at about 600° C. By heat treating at 600° C. for up to 24 hours, a uniform precipitate distribution is permitted to form with individual particle diameters of approximately 100A. The particles grow by the diffusion of Fe ions from the glass matrix and thereby diminish the force for driving phase separation. The preheat treatment at 600° C. therefore reduces the clustering of the precipitates when the composition is then taken to higher temperatures after the 600° C. treatment. The magnetic behavior of these compositions is shown in FIG. 3. The composition given no preheat treatment is no longer superparamagnetic, showing relatively large remanence and coercive force. The 600° C.-24 hours preheated composition still retains superparamagnetic behavior and it should be noted has a much higher initial susceptibility that the non-preheated composition, although their saturation moments are about the same. As indicated, the precipitation is a complex multistage process with two competing phase separation mechanisms operative in the temperature range given. A schematic diagram of the process is given in FIG. 7.

As indicated, the magnetic glass carrier compositions of this invention may vary in size and shape. However, it is preferred that the composite material have a spherical shape as to avoid rough edges or protrusions which have a tendency to abrade more easily. Particularly useful results are obtained when the composite material has an average particle size from about 50 microns to about 300 microns, although satisfactory results may be obtained when the composite material has an average particle size of from between about 10 microns and about 850 microns. The size of the carrier particles employed will, of course, depend upon several factors, such as the type of images ultimately developed, the machine configurations, and so forth. The magnetic glass carrier particles of this invention may have any suitable bulk density. Satisfactory results may be obtained when the carrier particles have an average bulk density of between about 2.5 and about 2.8 grams/cm$^3$. However, it is preferred that the carrier particles have an average bulk density of less than about 2.8 grams/cm$^3$ because machine stress levels are substantially reduced thereby reducing toner impaction and developer degradation. The composite carrier particles of this invention may have a smooth surface, they may have cracks or fissures in the surface, and they may be porous. However, it is preferred that the particles have a smooth surface to minimize abrasion thereof.

To achieve further variation in the properties of the magnetic glass carrier particles of this invention, well known insulating polymeric resin coating materials may be applied thereto. That is, it may be desirable for some applications to alter and control the conductivity or triboelectric properties of the carrier particles of this invention. Thus, this may be accomplished by applying thereto typical insulating carrier coating materials as described by L. E. Walkup in U.S. Pat. No. 2,618,551; B. B. Jacknow et al. in U.S. Pat. No. 3,526,533; and R. J. Hagenbach et al. in U.S. Pat. Nos. 3,533,835 and 3,658,500. Typical electrostatographic carrier particle coating materials include vinyl chloride-vinyl acetate copolymers, poly-p-xylylene polymers, styrene-acrylate-organosilicon terpolymers, natural resins such as caoutchouc, colophony, copal, dammar, Dragon's Blood, jalap, storax; thermoplastic resins including the polyolefins such as polyethylene, polypropylene, chlorinated polyethylene, and chlorosulfonated polyethylene; polyvinyls and polyvinylidenes such as polystyrene, polymethylstyrene, polymethyl methacrylate, polyacrylonitrile, polyvinyl acetate, polyvinyl alcohol, polyvinyl butyral, polyvinyl chloride, polyvinyl carbazole, polyvinyl ethers, and polyvinyl ketones; fluorocarbons such as polytetrafluoroethylene, polyvinyl fluoride, polyvinylidene fluoride, and polychlorotrifluoroethylene; polyamides such as polycaprolactam and polyhexamethylene adipamide; polyesters such as polyethylene terephthalate; polyurethanes; polysulfides; polycarbonates, thermosetting resins including phenolic resins such as phenolformaldehyde, phenol-furfural and resorcinol formaldehyde; amino resins such as urea-formaldehyde and melamineformaldehyde; epoxy resins; and the like.

When the magnetic glass carrier particles of this invention are overcoated with an insulating resinous material any suitable electrostatographic carrier coating thickness may be employed. However, a polymeric coating having a thickness at least sufficient to form a thin continuous film on the carrier particle is preferred because the carrier coating will then possess sufficient thickness to resist abrasion and prevent pinholes which adversely affect the triboelectric properties of the coated carrier particles. Generally, for cascade and magnetic brush development, the carrier coating may comprise from about 0.1 percent to about 30.0 percent by weight based on the weight of the coated carrier particles. Preferably, the carrier coating should comprise from about 0.2 percent to about 2.0 percent by weight based on the weight of the coated carrier particles because maximum durability, toner impaction resistance, and copy quality are achieved.

Any suitable well known toner material may be employed with the magnetic glass carriers of this invention. Typical toner materials include gum copal, gum sandarac, rosin, cumaroneindene resin, asphaltum, gilsonite, phenolformaldehyde resins, rosin modified phenolformaldehyde resins, methacrylic resins, polystyrene resins, polypropylene resins, epoxy resins, polyethylene resins, polyester resins, and mixtures thereof. The particular toner material to be employed obviously depends upon the separation of the toner particles from the magnetic carrier in the triboelectric series and should be sufficient to cause the toner particles to electrostatically cling to the carrier surface. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. Reissue No. 25,136 to Carlson and U.S. Pat. No. 2,788,288 to Rheinfrank et al. These toners generally have an average particle diameter between about 1 and 30 microns.

Any suitable colorant such as a pigment or dye may be employed to color the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Ozalate, lampblack, Rose Bengal, Monastral Red, Sudan Black BM, and mixtures thereof. The pigment or dye should be present in a quality sufficient to render it highly colored so that it will form a clearly visible image on a recording member. Preferably, the pigment is employed in an amount from about 3 percent to about 20 percent by weight based on the total weight of the colored toner because high quality images are obtained. If the toner colorant employed is a dye, substantially smaller quantities of colorant may be used.

Any suitable conventional toner concentration may be employed with the magnetic glass carriers of this invention. Typical toner concentrations for development systems include about 1 part toner with about 10 to about 200 parts by weight of carrier. When employing the magnetic glass carriers of this invention for development of electrostatic latent images, the amount of toner material present should be from between about 10 percent to about 100 percent of the surface area of the carrier particles.

The carrier materials of the instant invention may be mixed with finely-divided toner particles and employed to develop electrostatic latent images on any suitable electrostatic latent image-bearing surface including conventional photoconductive surfaces. Typical inorganic photoconductor materials include: sulfur, selenium, zinc sulfide, zinc oxide, zinc cadmium sulfide, zinc magnesium oxide, cadmium selenide, zinc silicate, calcium strontium sulfide, cadmium sulfide, mercuric iodide, mercuric oxide, mercuric sulfide, indium tri-sulfide, gallium selenide arsenic disulfide, arsenic trisulfide, arsenic triselenide, antimony trisulfide, cadmium sulfoselenide, and mixtures thereof. Typical organic photoconductors include: quinacridone pigments, phthalocyanine pigments, triphenylamine, 2,4-bis (4,4'-diethylaminophenol)-1,3,4-oxadiazol, N-isopropylcarbazole, triphenylpyrrole, 4,5-diphenylimidazolidinone, 4,5-diphenylimidazolidinethione, 4,5-bis-(4' aminophenyl)-imidazolidinone, 1,4-dicyanonaphthalene, 1,4-dicyanonaphthalene, aminophthalocinitrile, nitrophthalodinitrile, 12,3,5,6-tetra-azacyclooctatetetraene-(2,4,6,8), 2-mercaptobenzothiazole-2-phenyl-4-diphenylidene-oxazolone, 6-hydroxy-2,3-di(p-methoxyphenyl)-benzofurance, 4-dimethylaminobenzylidenebenzhydrazide, 2-benzylidene-aminocarbazole, polyvinyl carbazole, (2-nitrobenzylidene)-p-bromoaniline, 2,4-diphenylquinazoline, 1,2,4-triazine, 1,3,-diphenyl-3-methylpyrazoline, 2-(4'-dimethylamino phenyl)-benzoxazole, 3-amine-carbazole, and mixtures thereof. Representative patents in which photoconductive materials are disclosed include U.S. Pat. Nos. 2,803,542 to Ullrich, U.S. Pat. No. 3,121,007 to Middleton, and U.S. Pat. No. 3,151,982 to Corrsin.

The magnetic glass carrier materials of this invention provide numerous advantages when employed to develop electrostatic latent images. For example, it has been found that carrier of reduced density reduces levels of mechanical stress in xerographic developer compositions, the reduction resulting in lower toner impaction levels.

The following examples further define, describe, and compare preferred methods of preparing and utilizing the magnetic glass carriers of the present invention in electrostatographic applications. Parts and percentages are by weight unless otherwise indicated.

EXAMPLE 1

A quantity of magnetic glass carrier particles was prepared by mixing about 36.6 moles of $SiO_2$, about 27.0 moles of $B_2O_3$, about 22.8 moles of CaO, and about 8.6 miles of $Al_2O_3$ and about 5.0 moles of $Fe_2O_3$. The mixture was melted in a platinum crucible by heating up to about 1350° C. with stirring. The melt was quenched in water after which the quenched glass was ground to about 100–200 mesh size. The glass was heated at a variety of temperatures in the range between the glass transformation temperature (650° C.) and the softening temperature (970° C.). None of the heat treated samples showed any precipitation of a ferrimagnetic phase or a devitrification of the base glass. The magnetic behavior of the heat treated glass was determined to be paramagnetic at room temperature.

EXAMPLE II

A quantity of magnetic glass carrier particles was prepared by mixing about 34.0 moles of $SiO_2$, about 25.0 moles of $B_2O_3$, about 21.0 moles of CaO, about 8.0 moles of $Al_2O_3$, and about 12.0 moles of $Fe_2O_3$. The mixture was melted in a platinum crucible by heating up to about 1350° C. with stirring. The melt was quenched in water after which the quenched glass was ground to about 100–200 mesh size. The ground glass was heated at a temperature of about 680° C. for about 1 hour. The saturation magnetization was determined to be about 13 emu/gm. The glass was superparamagnetic, showing no hystersis behavior and had an initial susceptibility of about $3 \times 10^{-2}$ emu/gm-oe The coarse material was mixed with about 1.5% by weight of toner particles having an average diameter of about 14 microns to form a developer mixture. When employed in a magnetic brush development fixture, it was found that the glass particles formed a good, uniform, tractable, soft brush. A developability test with the developer mixture provided good xerographic print quality with acceptable solid area development and low background.

EXAMPLE III

A quantity of magnetic glass carrier particles was prepared by mixing about 34.0 moles of $SiO_2$, about 25.0 moles of $B_2O_3$, about 21.0 moles of CaO, about 8.0 moles of $Al_2O_3$ and about 12.0 moles of $Fe_2O_3$. The mixture was melted in a platinum crucible by heating up to about 1350° C., with stirring. The melt was quenched in water after which the quenched glass was ground to about 100–200 mesh size. The ground glass was heated at a temperature of about 800° C. for about 1 hour. The saturation magnetization was found to be about 14.5 emu/gm. The glass is no longer superparamagnetic showing definite hysteresis behavior with a coercivity of about 50 oersteds. The initial susceptibility is now about $1.8 \times 10^{-2}$ emu/gm-oe.

EXAMPLE IV

A quantity of magnetic glass carrier particles was prepared by mixing about 34.0 moles of $SiO_2$, about 25.0 moles of $B_2O_3$, about 21.0 moles of CaO, about 8.0 moles of $Al_2O_3$ and about 12.0 moles of $Fe_2O_3$. The mixture was melted in a platinum crucible by heating up to about 1350° C., with stirring. The melt was quenched in water after which the quenched glass was ground to about 100–200 mesh size. The ground glass was first heated at a temperature of about 600° C. for about 24 hours and then heated at about 700° C. for about 1 hour. The saturation magnetization was determined to be about 16.0 emu/gm. The glass was superparamagnetic showing no hysteresis behavior and had an initial susceptibility of about $6 \times 10^{-2}$ emu/gm-oe.

The coarse material was mixed with about 1.5% by weight of toner particles having an average diameter of about 14 microns to form a developer mixture. When employed in a magnetic brush development fixture, it was found that the glass particles formed a good, uniform, tractable, soft brush. A developability test with the developer mixture provided good xerographic print quality with acceptable solid area development and low background.

EXAMPLE V

A quantity of magnetic glass carrier particles was prepared by mixing about 34.0 moles of $SiO_2$, about 25.0 moles of $B_2O_3$, about 21.0 moles of CaO, about 8.0 moles of $Al_2O_3$ and about 12.0 moles of $Fe_2O_3$. The mixture was melted in a platinum crucible by heating up to about 1350° C., with stirring. The melt was quenched in water after which the quenched glass was heated at a temperature of about 620° C. for about 24 hours. The saturation magnetization was determined to be less than about 8.0 emu/gm. The glass was superparamagnetic showing no hysteresis behavior, but had an initial susceptibility of less than about $1 \times 10^{-2}$ emu/gm-oe.

From the foregoing examples and figures the effect of heat treatment on the crystallization process and the electrical and magnetic properties of the magnetic glass carrier particles has been shown. It has been further found that these materials have desirable magnetic properties for use as carrier particles, that is, relatively high saturation magnetization and initial susceptibility, zero remanence and coercive force. Furthermore, the magnetic behavior displayed by these materials is consistent with that of superparamagnetic ferrites. The difference in the saturation magnetization of these materials is due to differences in the amount of precipitated phase and is illustrated in FIG. 2. The high initial susceptibility is a function of the number of precipitated $Fe_3O_4$ particles and the size of the particles. The initial susceptibility of the particles may be determined according to the equation $$X_i = \frac{\sigma}{H(H \to 0)} = \frac{NI_s^2 V}{3kT}$$

where $\sigma$ is the mass magnetization of the precipitated glass, H is the applied field, N is the number of particles per unit volume, $I_s$ is the intrinsic saturation magnetization of the individual particle, V is the volume of the individual particle, $k$ is the Boltzman constant, and T is the temperature at which the magnetization is taken.

From observations, it may be concluded that the heat treatment of magnetic glass particles produces mechanically and chemically stable composites which are high resistivity semiconductors, and which, additionally, display superparamagnetism. The magnetic behavior observed for these magnetic compositions ranges from superparamagnetic behavior to that typical of dispersions of small, multi-domain particles. The compositions show good initial magnetic response (indicated by a relatively high $\beta$) indicating the use of these materials as magnetic carrier particles. Further, the various magnetic parameters, $M_s$, $H_c$, $\mu_{eff}$ of the magnetic materials can be controlled by varying the preparation technique and starting components of the materials. This type of control offers a wide lattitude in design parameters not easily achieved with solid or high density magnetic carriers. In addition, there is a direct relationship between the magnetic characteristics of the composites and the amount and morphology of the precipitated phase as reflected in the relative values of $X_i$, $M_s$ and $H_c$ for the materials of the various Examples.

Other modifications of the present invention will occur to those skilled in the art upon a reading of the present disclosure. There are intended to be included within the scope of this invention.

What is claimed is:

1. A low density, magnetic, composite electrostatographic carrier particle consisting essentially of a borosilicate glass further containing about 20 molar percent CaO, about 10 molar percent $Al_2O_3$, and from between about 10 to about 15 molar percent $Fe_2O_3$ in which superparamagnetic $Fe_3O_4$ ferrite crystallites having an average particle size of up to about 500 A have been precipitated by heat treatment of said glass at temperatures in the range of between about 600° C. and about 800° C. for up to about 24 hours, wherein said carrier particle has a resistivity on the order of about $10^6$ to about $10^{12}$ ohm/cm and displays soft magnetic properties with a lack of hysteresis behavior.

2. A low density, magnetic, composite electrostatographic carrier particle in accordance with claim 1 wherein said carrier particle has a conductivity of greater than about $10^{-10}$ ohm-cm. at 25° C.

3. A low density, magnetic, composite electrostatographic carrier particle in accordance with claim 1 wherein said ferrite crystallites have been precipitated by heat treatment at a temperature of about 600° C. for up to about 24 hours followed by heat treatment at a temperature of about 700° C. for about 1 hour.

4. A low density, magnetic, composite electrostatographic carrier particle in accordance with claim 1 wherein said carrier particle has an average particle size of from between about 10 microns and about 850 microns.

5. A low density, magnetic, composite electrostatographic carrier particle in accordance with claim 1 wherein said carrier particle has an average bulk density of between about 2.5 and about 2.8 grams/cm$^3$.

6. A low density, magnetic, composite electrostatographic carrier particle in accordance with claim 1 wherein said carrier particle has an overcoating of an insulating resinous material.

7. A low density, magnetic composite electrostatographic carrier particle comprising alumino-boro-silicate glass containing about 40 molar percent $SiO_2$, about 30 molar percent $B_2O_3$, about 20 molar percent CaO, and about 10 molar percent $Al_2O_3$, said alumino-boro-silicate glass also containing from between about 10 to about 15 molar percent $Fe_2O_3$ in which superparamagnetic $Fe_3O_4$ ferrite crystallites having an average particle size of up to about 500 A have been precipitated by heat treatment of said glass at temperatures in the range of between about 600° C. and about 800° C. for up to about 24 hours, wherein said carrier particle has a resistivity on the order of about $10^6$ to about $10^{12}$ ohm/cm and displays soft magnetic properties with a lack of hysteresis behavior.

8. A low density, magnetic, composite electrostatographic carrier particle in accordance with claim 7 wherein said carrier particle has a conductivity of greater than about $10^{-10}$ ohm-cm. at 25° C.

9. A low density, magnetic, composite electrostatographic carrier particle in accordance with claim 7 wherein said ferrite crystallites have been precipitated by heat treatment at a temperature of about 600° C. for up to about 24 hours followed by heat treatment at a temperature of about 700° C. for about 1 hour.

10. A low density, magnetic, composite electrostatographic carrier particle in accordance with claim 7 wherein said carrier particle has an average particle size of from between about 10 microns and about 850 microns.

11. A low density, magnetic, composite electrostatographic carrier particle in accordance with claim 7 wherein said carrier particle has an average bulk density of between about 2.5 and about 2.8 grams/cm$^3$.

12. A low density, magnetic, composite electrostatographic carrier particle in accordance with claim 7 wherein said carrier particle has an overcoating of an insulating resinous material.

* * * * *